United States Patent
Boyle (10) Patent No.: US 8,699,171 B1
(45) Date of Patent: Apr. 15, 2014

(54) DISK DRIVE SELECTING HEAD FOR WRITE OPERATION BASED ON ENVIRONMENTAL CONDITION

(75) Inventor: William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 562 days.

(21) Appl. No.: 12/895,056

(22) Filed: Sep. 30, 2010

(51) Int. Cl.
*G11B 21/02* (2006.01)
*G11B 19/02* (2006.01)
*G11B 27/36* (2006.01)

(52) U.S. Cl.
USPC .................. 360/75; 360/31; 360/69; 711/112

(58) Field of Classification Search
None
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,807,630 B2 | 10/2004 | Lay et al. | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,079,348 B2 | 7/2006 | Ishii et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,170,700 B1 | 1/2007 | Lin et al. | |
| 7,184,241 B1 | 2/2007 | Mallary et al. | |
| 7,283,316 B2 * | 10/2007 | Chiao et al. ..................... 360/48 |
| 7,334,082 B2 | 2/2008 | Grover et al. | |
| 7,395,452 B2 | 7/2008 | Nicholson et al. | |
| 7,411,757 B2 | 8/2008 | Chu et al. | |
| 7,461,202 B2 | 12/2008 | Forrer, Jr. et al. | |
| 7,472,222 B2 | 12/2008 | Auerbach et al. | |

(Continued)

FOREIGN PATENT DOCUMENTS

| JP | 2001-135018 A | 5/2001 |
|---|---|---|
| JP | 2003-016745 A | 1/2003 |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Andrew L Sniezek (57) ABSTRACT

A disk drive is disclosed comprising a plurality of disk surfaces, and a head actuated over each disk surface. When a write command is received, the data is written to a selected disk surface in response to a measured environmental condition. For example, the heads may exhibit different write performance based on the ambient temperature, and therefore the head to write data may be selected based on a measured ambient temperature at the time of the write operation.

24 Claims, 6 Drawing Sheets

(56) References Cited

U.S. PATENT DOCUMENTS

| | | | |
|---|---|---|---|
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,529,058 B2 | 5/2009 | Hara et al. | |
| 7,545,593 B1 | 6/2009 | Sun et al. | |
| 7,570,445 B2 | 8/2009 | Alfred et al. | |
| 7,610,438 B2 | 10/2009 | Lee et al. | |
| 7,613,876 B2 | 11/2009 | Bruce et al. | |
| 7,644,231 B2 | 1/2010 | Recio et al. | |
| 7,685,360 B1 | 3/2010 | Brunnett et al. | |
| 7,752,491 B1 | 7/2010 | Liikanen et al. | |
| 7,760,455 B2 | 7/2010 | Kang et al. | |
| 8,315,006 B1 | 11/2012 | Chahwan et al. | |
| 2005/0141129 A1 | 6/2005 | Schmidt et al. | |
| 2006/0195657 A1 | 8/2006 | Tien et al. | |
| 2006/0215307 A1 | 9/2006 | Yoshida et al. | |
| 2008/0040537 A1 | 2/2008 | Kim | |
| 2008/0059694 A1 | 3/2008 | Lee | |
| 2008/0130156 A1 | 6/2008 | Chu et al. | |
| 2008/0177938 A1 | 7/2008 | Yu | |
| 2008/0222353 A1 | 9/2008 | Nam et al. | |
| 2008/0256287 A1 | 10/2008 | Lee et al. | |
| 2008/0266697 A1* | 10/2008 | Ohta et al. | 360/57 |
| 2008/0307270 A1 | 12/2008 | Li | |
| 2009/0019218 A1 | 1/2009 | Sinclair et al. | |
| 2009/0031072 A1 | 1/2009 | Sartore | |
| 2009/0103203 A1 | 4/2009 | Yoshida | |
| 2009/0106518 A1 | 4/2009 | Dow | |
| 2009/0144501 A2 | 6/2009 | Yim et al. | |
| 2009/0150599 A1 | 6/2009 | Bennett | |
| 2009/0172324 A1 | 7/2009 | Han et al. | |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0002327 A1* | 1/2010 | Call et al. | 360/31 |
| 2010/0088459 A1 | 4/2010 | Arya et al. | |

OTHER PUBLICATIONS

Xiaojian Wu, A. L. Narasimha Reddy, "Managing Storage Space in a Flash and Disk Hybrid Storage System", http://www.ee.tamu.edu/~reddy/papers/mascots09.pdf.

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf, 2009.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf, 2009.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

* cited by examiner

DISK DRIVE SELECTING HEAD FOR WRITE OPERATION BASED ON ENVIRONMENTAL CONDITION

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
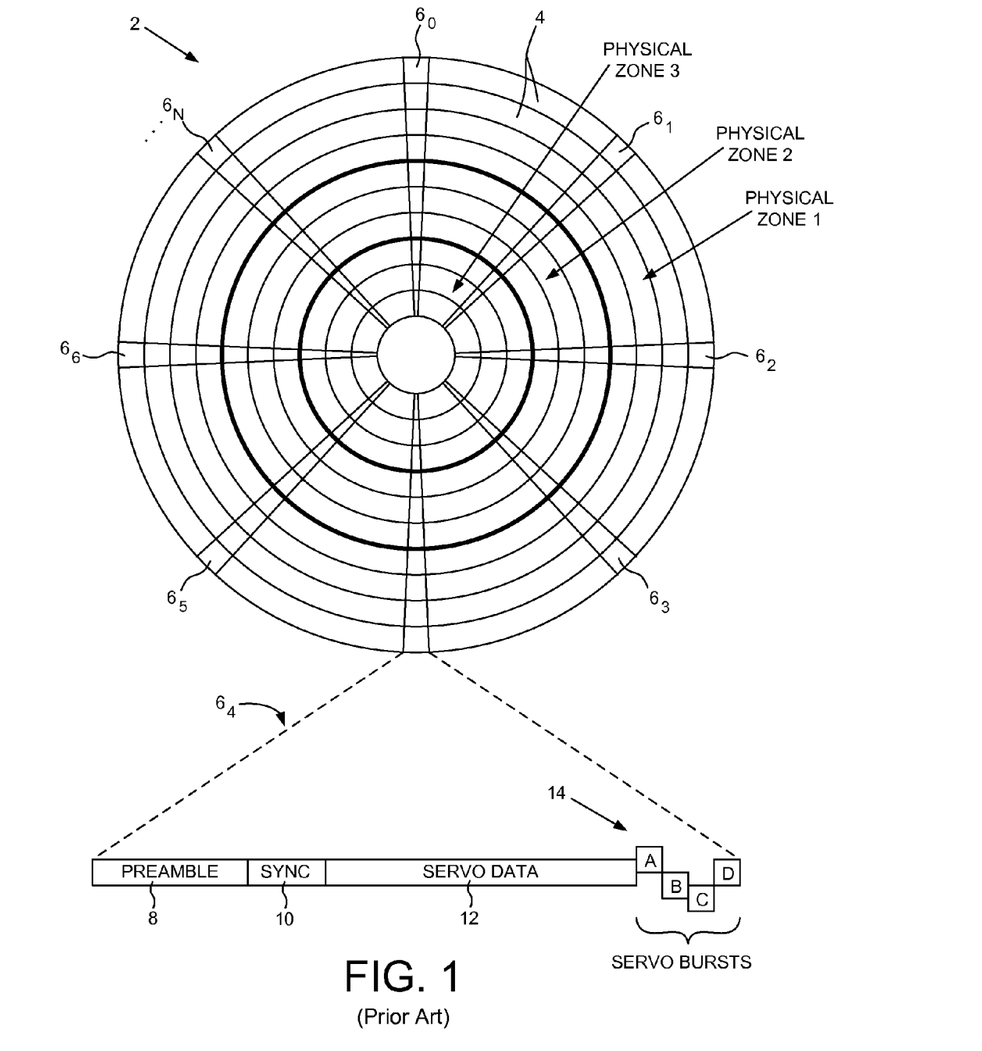
FIG. 1 shows a prior art disk format comprising a plurality of data tracks defined by embedded servo sectors.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 2A:
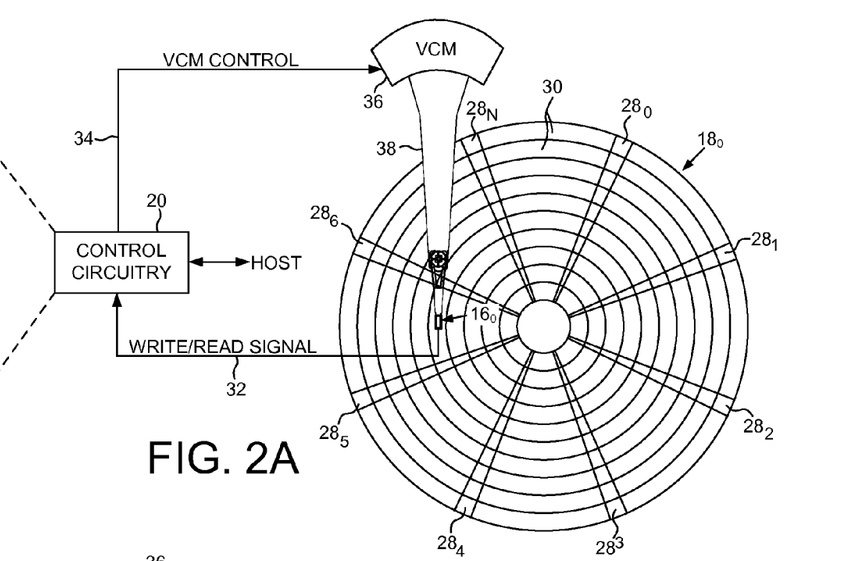
FIGS. 2A and 2B show a disk drive according to an embodiment of the present invention comprising a plurality of disks and a head actuated over each disk surface.
Figures 2B, 2D:
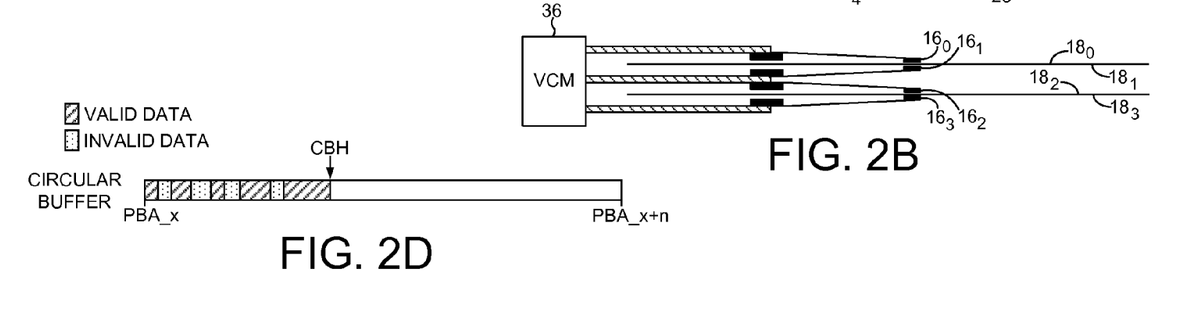
FIG. 2D shows an embodiment of the present invention wherein dynamic logical block address (LBA) mapping is implemented using a circular buffer.
Figure 2C:
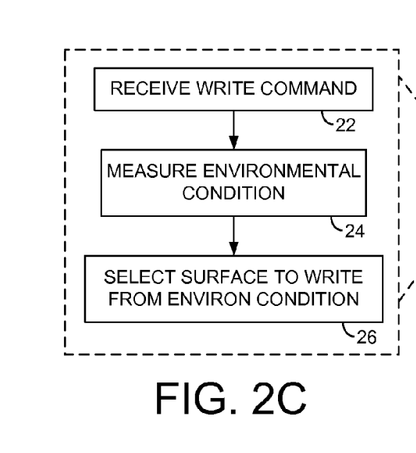
FIG. 2C is a flow diagram according to an embodiment of the present invention wherein when a write command is received the disk surface to write is selected based on a measured environmental condition.

FIGS. 2A and 2B show a disk drive according to an embodiment of the present invention comprising a plurality of disk surfaces $18_0$-$18_N$ and a head $16_0$-$16_N$ actuated over each disk surface. The disk drive further comprises control circuitry 20 operable to execute the flow diagram of FIG. 2C, wherein when a write command is received (step 22), an environmental condition is measured (step 24) and a disk surface to write the data is selected based on the measured environmental condition (step 26).

In the embodiment of FIG. 2A, each disk surface 18, comprises a plurality of servo sectors $28_0$-$28_N$ that define a plurality of data tracks 30, wherein each data track comprises a plurality of data sectors. The control circuitry 20 processes a read signal 32 to demodulate the servo sectors into a position error signal (PES). The PES is filtered with a suitable compensation filter to generate a control signal 34 applied to a voice coil of a voice coil motor (VCM) 36 which rotates an actuator arm 38 about a pivot to position the head radially over the disk surface in a direction that reduces the PES.

In one embodiment, the data sectors on each disk surface are accessed indirectly by mapping a logical block address (LBA) to a physical block address (PBA) mapped to a data sector. The LBA to PBA mapping facilitates mapping out defective data sectors by mapping out the corresponding PBAs. In one embodiment, the LBA to PBA mapping also facilitates dynamic LBA mapping wherein the LBAs of a write command are dynamically mapped to PBAs of a selected disk surface when the write command is executed. In this manner, the disk surface may be selected that provides the best performance relative to a measured environmental condition (e.g., temperature, pressure, etc.).

Dynamic LBA mapping may be implemented in any suitable manner in the embodiments of the present invention. In one embodiment illustrated in FIG. 2D, dynamic LBA mapping is implemented using one or more a circular buffers of PBAs on each disk surface. New data is written to the circular buffer head (CBH) and the LBAs mapped to the corresponding PBAs. When an LBA is overwritten, the PBA storing the old data toward the circular buffer tail is invalidated so that it may be overwritten. A garbage collection operation may be executed periodically to relocate the fragmented valid data sectors from the circular buffer tail to the circular buffer head so that the tail may be overwritten as a consecutive sequence of data sectors. Techniques other than a circular buffer may be employed to implement dynamic LBA mapping in the embodiments of the present invention.

In one embodiment, the sensitivity of each head $16_0$-$16_N$ and/or each disk surface $18_0$-$18_N$ may vary due to tolerances in manufacturing and materials. In addition, varying environmental conditions (temperature, pressure, etc.) may have an adverse affect on the sensitivity of the head/disk interfaces. Accordingly, each head/disk interface may exhibit a different level of performance (bit error rate, signal-to-noise ratio, etc.) depending on the environmental conditions at the time of a write operation. In one embodiment, if a measured environmental condition exceeds a threshold, a disk surface having a higher reliability is selected to perform the write operation (e.g., a disk surface having a higher head/disk sensitivity, or in another embodiment, a disk surface having a lower recording density).

In one embodiment, the heads $16_0$-$16_N$ in the disk drive may be tested over different environmental conditions so that a correlation can be established and the appropriate disk surface selected during each write operation. Any suitable test may be executed to measure the performance of each head at varying environmental conditions, such as measuring a bit error rate when writing/reading a test pattern, or by measuring an off-track read capability of each head. The heads may be tested during a manufacturing procedure of each disk drive and/or periodically while the disk drive is in the field. An embodiment of this invention is illustrated in the flow diagram of FIG. 3A wherein the heads are tested relative to different environmental conditions to establish the correlation (step 40). When a write command is received comprising an LBA (step 42), an environmental condition(s) is measured (step 44) and a disk surface is selected in response to the measured environmental condition (step 46). The data is written to the head of a circular buffer on the selected disk surface (step 48), and the LBA is mapped to a PBA at the circular buffer head (step 50).

In one embodiment, a frequently written disk surface during extreme environmental conditions may approach its capacity limit. In one embodiment, when the high reliability disk surface nears its capacity, and the disk drive is operating under nominal environmental conditions, data is relocated from the high reliability disk surface to one or more of the other disk surfaces in order to free space on the high reliability disk surface.

Figure 3A:
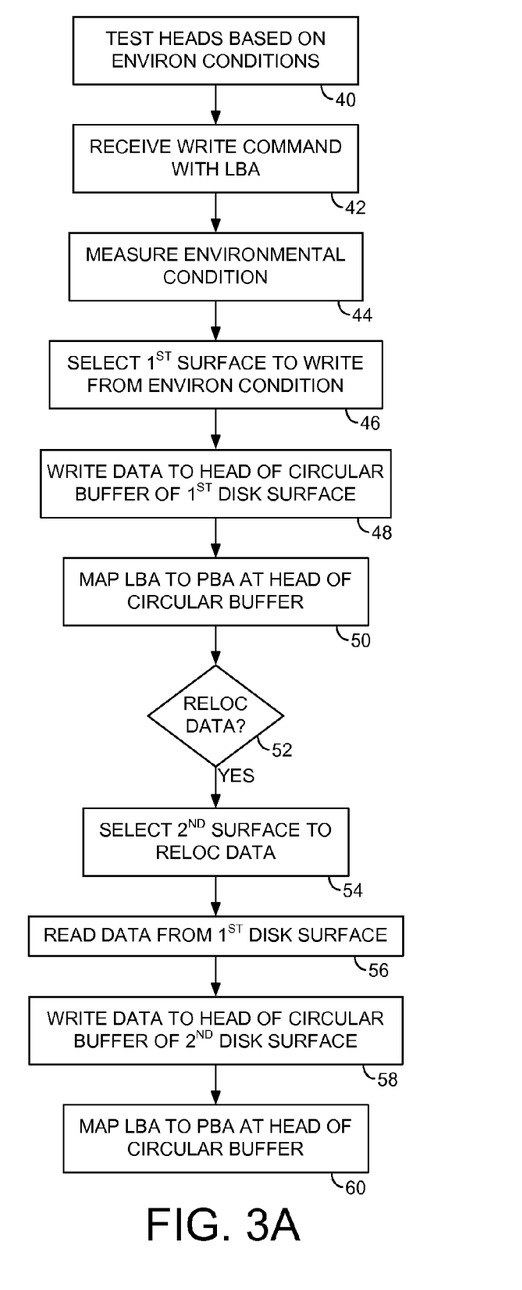
FIG. 3A is a flow diagram according to an embodiment of the present invention wherein when the environmental conditions are within nominal limits the data is copied from a first disk surface to a second disk surface in order to free space on the first disk surface.

This embodiment is illustrated the flow diagram of FIG. 3A wherein when a decision is made to relocate data from a first disk surface (step 52), a second disk surface is selected to store the relocated data (step 54). The second disk surface may be selected based on any suitable criteria, such as the amount of free space and/or a current state of a measured environmental condition. Data is read from the first disk surface (step 56) and written to the head of a circular buffer on the second disk surface (step 58). The corresponding LBAs are mapped to the PBAs at the head of the circular buffer on the second disk surface (step 60).

Figure 3B:
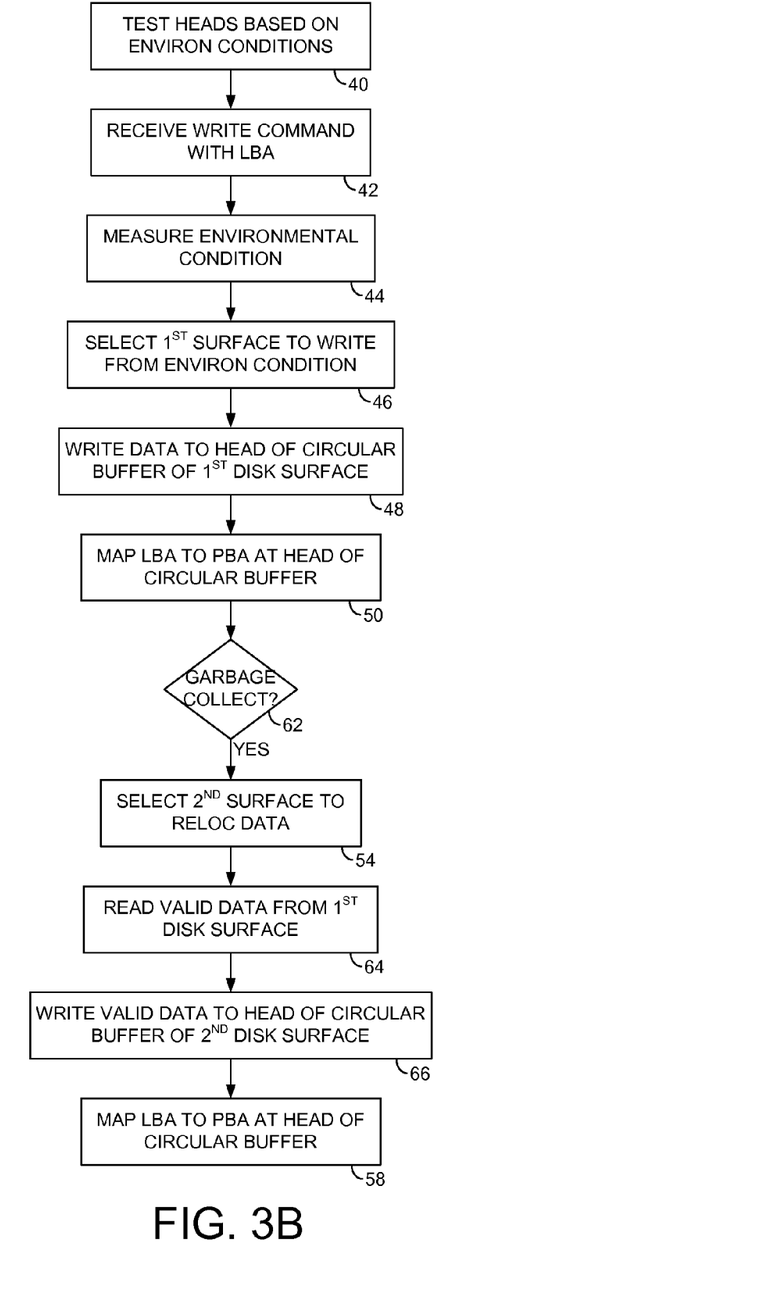
FIG. 3B is a flow diagram according to an embodiment of the present invention wherein the data is copied to a second disk surface during a garbage collection operation.

In an embodiment illustrated in the flow diagram of FIG. 3B, the decision to relocate data from a first disk surface to a second disk surface occurs when executing a garbage collection operation on the first disk surface (step 62). The garbage collection operation relocates fragmented valid data so that the invalid data sectors can be overwritten as a consecutive sequence. During the garbage collection operation, valid data is read from the first disk surface (step 64) and written to the head of a circular buffer on a second disk surface (step 66). In one embodiment, the valid data is relocated to the second disk surface if the environmental conditions are conducive to writing to the second disk surface. Otherwise, the valid data may be rewritten to the first disk surface (e.g., written to a head of a circular buffer on the first disk surface). The garbage collection operation may be performed at any suitable time, including periodically, or when the amount of fragmented valid data exceeds a threshold. In one embodiment, the garbage collection operation may be deferred until the environmental conditions are conducive to relocating data to a second disk surface.

Figure 4A:
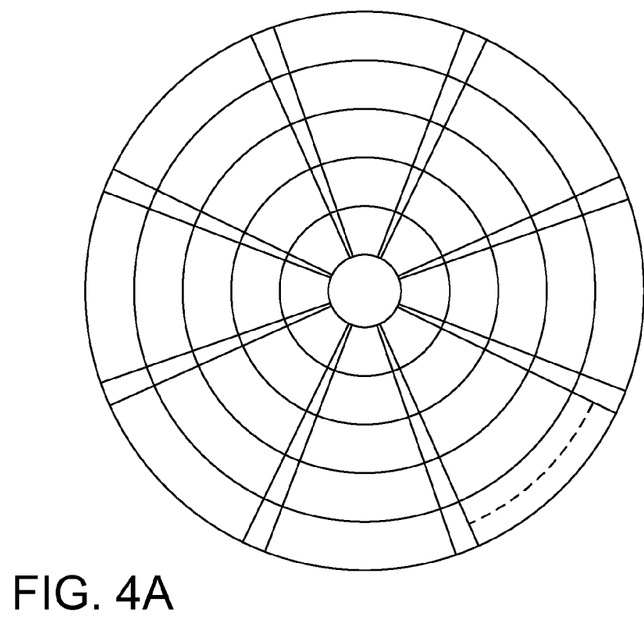
FIGS. 4A and 4B shows an embodiment of the present invention wherein the first disk surface may comprise a lower radial and/or linear density for writing data during extreme environmental conditions.
Figure 4B:
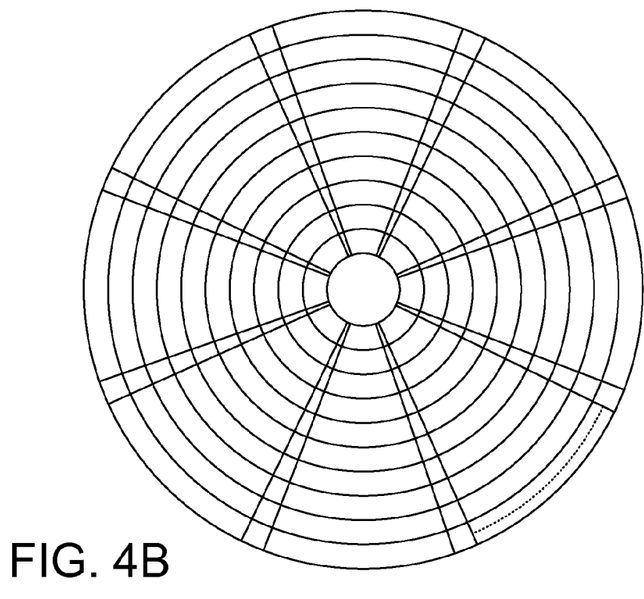

In one embodiment, data is written to one or more of the disk surfaces at a lower recording density to improve reliability under extreme environmental conditions. An example of this embodiment is shown in FIG. 4A wherein the radial density (data tracks per inch) and/or the linear density (data rate of the data sectors) of a first disk surface is reduced compared to the disk surface shown in FIG. 4B. Because the disk surface of FIG. 4A has a lower recording density, it also has less capacity and therefore fills up faster than the other disk surfaces. Accordingly, in one embodiment when the environmental conditions are within nominal limits, the data is relocated from the lower density disk surface to a higher density disk surface.

Figure 5A:
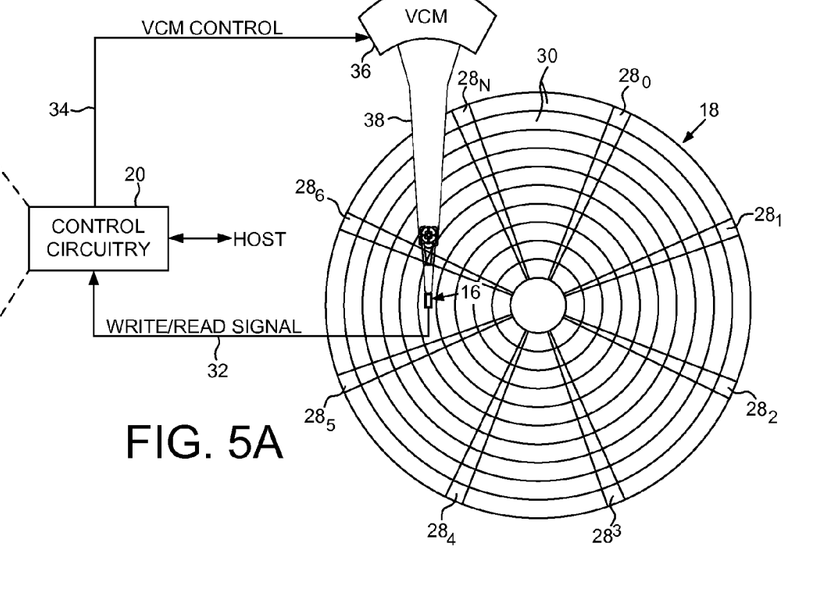
FIGS. 5A and 5B show a disk drive according to an embodiment of the present invention wherein when a write command is received, an area of a disk surface is selected based on a measured ambient temperature.
Figure 5B:
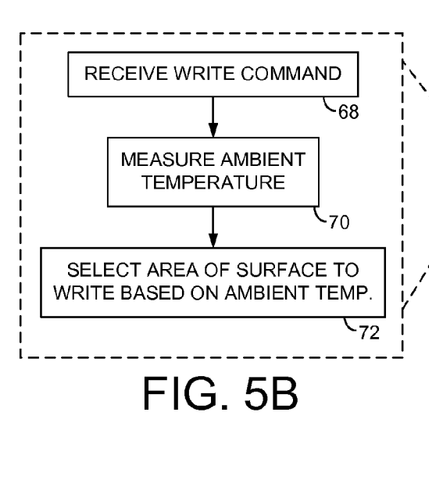

FIG. 5A shows a disk drive according to an embodiment of the present invention comprising a head 16 actuated over a disk surface 18 and control circuitry 20 operable to execute the flow diagram of FIG. 5B. When a write command is received comprising write data (step 68), an ambient temperature of the disk drive is measured (step 70). An area of the disk surface is then selected to write the data in response to the measured ambient temperature (step 72). For example, at extreme ambient temperatures (hot or cold) the data may be written more reliably at a particular radial location (e.g., inner, middle, or outer diameter tracks). Similar to the embodiments described above, data may eventually be migrated to other areas of the disk surface (or to a different disk surface) when the ambient temperature is within nominal limits.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a plurality of disk surfaces including a first disk surface and a second disk surface;
   a head actuated over each disk surface including a first head actuated over the first disk surface and a second head actuated over the second disk surface; and
   control circuitry operable to:
   receive a write command comprising data;
   measure an environmental condition;
   measure a performance metric of each head relative to the environmental condition; and
   select the first disk surface to write the data in response to the measured environmental condition and the measured performance metric.

2. The disk drive as recited in claim 1, wherein the environmental condition comprises an ambient temperature.

3. The disk drive as recited in claim 1, wherein the environmental condition comprises a pressure.

4. The disk drive as recited in claim 1, wherein the control circuitry is further operable to relocate the data from the first disk surface to the second disk surface when the environmental condition changes.

5. The disk drive as recited in claim 4, wherein the control circuitry is further operable to relocate the data during a garbage collection operation of the first disk surface.

6. The disk drive as recited in claim 5, wherein the control circuitry is further operable to:
   write the data to a head of a first circular buffer on the first disk surface; and
   relocate the data from a tail of the first circular buffer to a head of a second circular buffer on the second disk surface.

7. The disk drive as recited in claim 1, wherein the control circuitry is further operable to:
   receive a logical block address (LBA) from a host corresponding to the data; and
   map the LBA to a physical block address (PBA) in response to the environmental condition, wherein the PBA is assigned to a data sector on the first disk surface.

8. The disk drive as recited in claim 1, wherein the control circuitry is further operable to measure the performance metric of each head relative to the environmental condition during a manufacturing procedure of the disk drive.

9. The disk drive as recited in claim 1, wherein the control circuitry is further operable to measure the performance metric of each head relative to the environmental condition periodically while the disk drive is deployed.

10. The disk drive as recited in claim 1, wherein a capacity of the first disk surface is less than a capacity of the second disk surface.

11. The disk drive as recited in claim 10, wherein:
   each disk surface comprises a plurality of data tracks; and
   the first disk surface comprises fewer data tracks than the second disk surface.

12. The disk drive as recited in claim 10, wherein:
   the first disk surface comprises a first plurality of data sectors recorded at a first data rate; and
   the second disk surface comprises a second plurality of data sectors recorded at a second data rate higher than the first data rate.

13. A method of operating a disk drive, the disk drive comprising a plurality of disk surfaces including a first disk surface and a second disk surface, and a head actuated over each disk surface including a first head actuated over the first disk surface and a second head actuated over the second disk surface, the method comprising:
   receiving a write command comprising data;
   measuring an environmental condition;
   measuring a performance metric of each head relative to the environmental condition; and
   selecting the first disk surface to write the data in response to the measured environmental condition and the measured performance metric.

14. The method as recited in claim 13, wherein the environmental condition comprises an ambient temperature.

15. The method as recited in claim 13, wherein the environmental condition comprises a pressure.

16. The method as recited in claim 13, further comprising copying the data from the first disk surface to the second disk surface when the environmental condition changes.

17. The method as recited in claim 16, further comprising copying the data during a garbage collection operation of the first disk surface.

18. The method as recited in claim 17, further comprising:
   writing the data to a head of a first circular buffer on the first disk surface; and
   copying the data from a tail of the first circular buffer to a head of a second circular buffer on the second disk surface.

19. The method as recited in claim 13, further comprising:
   receiving a logical block address (LBA) from a host corresponding to the data; and
   mapping the LBA to a physical block address (PBA) in response to the environmental condition, wherein the PBA is assigned to a data sector on the first disk surface.

20. The method as recited in claim 13, further comprising measuring the performance metric of each head relative to the environmental condition during a manufacturing procedure of the disk drive.

21. The method as recited in claim 13, further comprising measuring the performance metric of each head relative to the environmental condition periodically while the disk drive is deployed.

22. The method as recited in claim 13, wherein a capacity of the first disk surface is less than a capacity of the second disk surface.

23. The method as recited in claim 22, wherein:
   each disk surface comprises a plurality of data tracks; and
   the first disk surface comprises fewer data tracks than the second disk surface.

24. The method as recited in claim 22, wherein:
   the first disk surface comprises a first plurality of data sectors recorded at a first data rate; and
   the second disk surface comprises a second plurality of data sectors recorded at a second data rate higher than the first data rate.

* * * * *